United States Patent [19]

Furuse

[11] Patent Number: 4,888,718
[45] Date of Patent: Dec. 19, 1989

[54] VOLUME MEASURING APPARATUS AND METHOD

[75] Inventor: Akio Furuse, Hachioji, Japan

[73] Assignee: Kubushiki Kaisha Kosumo Keiki, Tokyo, Japan

[21] Appl. No.: 148,526

[22] Filed: Jan. 26, 1988

[30] Foreign Application Priority Data

Feb. 25, 1987 [JP] Japan .................................. 62-43914
Mar. 13, 1987 [JP] Japan .................................. 62-58063

[51] Int. Cl.$^4$ .......................... G01F 1/34; G01M 3/02
[52] U.S. Cl. ................................... 364/564; 364/558; 73/149; 73/37
[58] Field of Search ................... 364/564, 558, 571.01; 73/37, 37.5, 37.9, 149, 195, 199, 1 H, 3, 4 R, 290 B

[56] References Cited

U.S. PATENT DOCUMENTS

| | | | |
|---|---|---|---|
| 4,112,738 | 12/1978 | Turner | 73/32 R |
| 4,187,715 | 2/1980 | Nevitt | 73/37.9 |
| 4,189,936 | 2/1980 | Ellis | 73/4 R |
| 4,675,834 | 6/1987 | Furuse | 364/558 |
| 4,763,518 | 8/1988 | Daviaud et al. | 73/149 |
| 4,840,064 | 6/1989 | Fudim | 73/149 |

FOREIGN PATENT DOCUMENTS

| | | | |
|---|---|---|---|
| 2524140 | 9/1983 | France | 73/149 |
| 80/02196 | 10/1980 | PCT Int'l Appl. | 73/149 |
| 0667813 | 6/1979 | U.S.S.R. | 73/149 |
| 0794382 | 1/1981 | U.S.S.R. | 73/149 |
| 2176016 | 12/1986 | United Kingdom | 73/149 |

*Primary Examiner*—Parshotam S. Lall
*Assistant Examiner*—Joseph L. Dixon
*Attorney, Agent, or Firm*—Pollock, Vande Sande and Priddy

[57] ABSTRACT

A volume measuring apparatus comprises pair of tanks of substantially the same volume for supplying gas to a container to be measured and a refernce container, a pressurized gas source for filling the pair of tanks with gas under the same pressure, a volume adder for providing a known volume variation to either one of the container to be measured and the reference container, and a differential pressure detector for measuring the differential pressure between the container to be measured and the reference container. The ratio of the differential pressure variation to the volume variation, which represents the sensitivity for detecting differential pressure, is precalculated based on differential pressure variations obtained in the cases where the volume variation is provided and is not provided. A container desired to be measured is connected to a measuring side pneumatic system and the volume of the container to be measured is computed using the detection sensitivity and the differential pressure measured, with the gas in the pair of tanks being released into the container to be measured and the reference container.

13 Claims, 5 Drawing Sheets

VOLUME MEASURING APPARATUS AND METHOD

BACKGROUND OF THE INVENTION

The present invention relates to an apparatus and a method for measuring the content volume of a container.

One conventional method for accurately measuring the content volume of a container is to measure the quantity of a liquid, in particular water, which is poured into the container until it is filled up. When this method is employed in a container manufacturing process, it is necessary to measure a large number of containers one after another, pour out the water therefrom and dry them after the measurement. This calls for a drainage or recovery installation for the water used and an installation for drying the measured containers. Further, the drainage and recovery installations must be kept leak-free. Thus the volume measurement using water requires bulky arrangements and consumes much time. Besides, to handle water is troublesome in various aspects.

In a similar volume measurement using a gas in place of water, since the gas is compressible, the measurement is affected by the gas pressure and is readily susceptible to temperature. In addition, since gas is lower in viscosity than water, its leaks in the container itself and the coupling portion between the container and the measuring apparatus have a great influence on the measurement. Accordingly, high precision measurements are difficult in the prior art.

SUMMARY OF THE INVENTION

An object of the present invention is to provide a volume measuring apparatus and method which employ gas to avoid the necessity of using bulky arrangements and the drying process and permit high precision measurement of the content volume of a container and which are particularly suitable for measuring scattering volumes of a large number of containers in succession.

According to the present invention, first and second tanks of substantially the same volume are connected to a predetermined pressurized gas source through first and second electromagnetic valves, respectively, and measuring side and reference side pipes are connected to the first and second tanks through third and fourth electromagnetic valves, respectively. A container desired to be measured and a reference container are connected to the measuring side and reference side pipes, respectively. A volume adder is connected to either the measuring side pipe or reference side pipe, for causing a predetermined change in its volume, and a differential pressure detector is connected between the measuring side and reference side pipes, for detecting the differential $\Delta P$ therebetween. The ratio of a differential pressure change to a volume change, which represents the detection sensitivity of the volume measuring apparatus, is obtained by calculation, using differential pressures $\Delta P_1$ and $\Delta P_2$ which are detected by the differential pressure detector after releasing the gas of the same pressure from the first and second tanks through the third and fourth electromagnetic valves into the container to be measured and the reference container, respectively, in the cases where the predetermined volume change is caused and where no such volume change is produced. A desired one of the containers to be measured is then connected to the measuring side pipe and the gas in the first and second tanks is released through the third and fourth electromagnetic valves, similarly detecting a differential pressure $\Delta P$. The volume of the container to be measured is computed using the above-noted detection sensitivity and the differential pressure $\Delta P$.

DESCRIPTION OF THE PREFERRED EMBODIMENTS

(A) Constitution of Mechanical System

Figure 1:
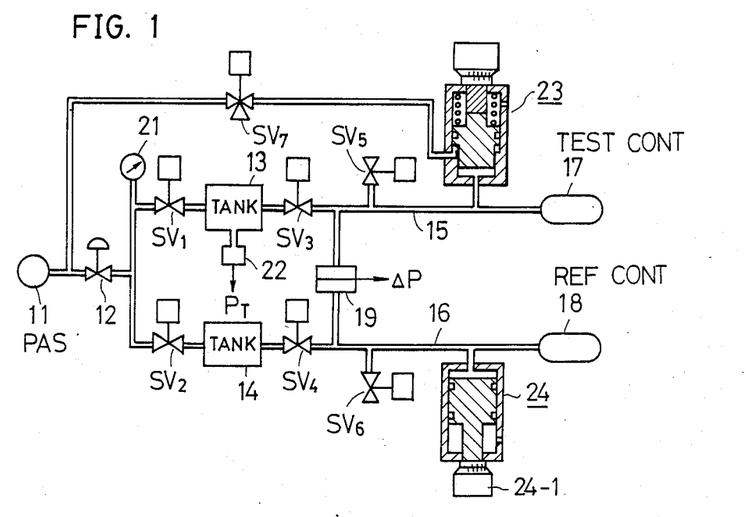
FIG. 1 is a diagram showing a mechanical system of the volume measuring apparatus of the present invention.

FIG. 1 shows the mechanical system of the volume measuring apparatus of the present invention. The following description will be given on the assumption that the gas for use in the volume measurement is air.

Compressed air in a compressed air source 11 is supplied via a pressure reduction valve 12 to inlet ports of two-way electromagnetic valves $SV_1$ and $SV_2$. The two-way electromagnetic valves $SV_1$ and $SV_2$ have their outlet ports connected to tanks 13 and 14 of the same content volume $V_T$, respectively. The tanks 13 and 14 are connected to a measuring side pipe 15 and a reference side pipe 16 through two-way electromagnetic valves $SV_3$ and $SV_4$, respectively. A container 17 to be measured and a reference container 18 are attached through suitable jigs to the measuring side pipe 15 and the reference side pipe 16, respectively. Between the pipes 15 and 16 there is connected through pipes a differential pressure detector 19 for detecting the differential pressure therebetween. Further, two-way electromagnetic valves $SV_5$ and $SV_6$ for vent use are connected to the measuring side pipe 15 and the reference side pipe 16, respectively. A pressure gage 21 is connected to the outlet port of the pressure regulating valve 12, for visually inspecting the regulation of the air pressure which is supplied ot the tanks 13 and 14. A pressure detector 22 for detecting the pressure in the tank 13 or 14, which is necessary for the volume calculation, is connected to the tank 13 in this example.

A closed system in which the tank 13, the container to be measured 17 and the pipes connected thereto intercommunicate one another will hereinafter be referred to as a measuring side pneumatic system. Similarly, a closed system in which the tank 14, the reference container 18 and the pipes connected thereto intercommunicate one another will hereinafter be referred to as a reference side pneumatic system. A volume adder 23 is connected to the measuring side pipe 15 for producing a known volume change in the measuring side pneumatic system. A volume adjuster 24 is connected to the reference side pipe 16 for roughly adjusting the balance between the total volume of the measuring side pneumatic system and the total volume of the reference side pneumatic system. The volume adder 23 comprises, for example, a cylinder and a piston movable therein. The stroke of the piston can be preset. In this example the piston is driven by compressed air through a three-way electromagnetic valve $SV_7$. The volume adjuster 24 also comprises a cylinder and a piston, and the piston can be moved by turning a knob 24-1.

(B) Principle of Measurement

In the above-described arrangement the electromagnetic valves $SV_3$, $SV_4$, $SV_5$ and $SV_6$ are closed in the state in which the measuring side pneumatic system and the reference side pneumatic system have been released to the atmospheric pressure. Next, the electromagnetic valves $SV_1$ and $SV_2$ are opened, through which air of a pressure $P_T$ is supplied into the tanks 13 and 14 to fill them up. Then the electromagnetic valves $SV_1$ and $SV_2$ are closed and the electromagnetic valves $SV_3$ and $SV_4$ are opened, after which the differential pressure $\Delta P$ between the pipes 15 and 16 is detected by the differential pressure detector 19.

In the following description, the volumes of the tanks 13 and 14 both including the associated pipes are equal to each other and represented by $V_T$, the volume of the container 17 including the measuring side pipe 15 connected thereto is represented by $V_W$, the volume of the reference container 18 including the reference side pipe 16 connected thereto is represented by $V_M$, the pressures of the measuring side and reference side pneumatic systems after opening the electromagnetic valves $SV_3$ and $SV_4$ are represented by $P_W$ and $P_M$, respectively, and the differential pressure detected by the differential pressure detector is represented by $\Delta P$.

$$V_W - V_M = \Delta V \quad (1)$$

$$P_W - P_M = \Delta P \quad (2)$$

According to the Boyles' law the following expressions hold:

$$V_T \cdot P_T = (V_T + V_M) \cdot P_M \quad (3)$$

$$V_T \cdot P_T = (V_T + V_W) \cdot P_W \quad (4)$$

Substituting expressions (1) and (2) into expression (4) and inserting $P_M$ of expression (3) in the result, $$V_T \cdot P_T = (V_T + V_M + \Delta V)(P_M + \Delta P)$$
$$= (V_T + V_M + \Delta V)\left(\frac{V_T \cdot P_T}{V_T \cdot V_M} + \Delta P\right)$$

As a result, the differential pressure $\Delta P$ is given by the following expression:

$$\Delta P = \frac{-\Delta V \cdot V_T \cdot P_T}{(V_T + V_M)^2 + \Delta V(V_T + V_M)} \quad (5)$$

If $\Delta V << (V_T + V_M)$ holds here, expression (5) can be approximated as follows:

$$\Delta P \simeq -\frac{V_T \cdot V_M}{(V_T + V_M)^2} \cdot \Delta V \quad (6)$$

Expression (6) shows that since the volumes $V_T$ and $V_M$ can be considered to remain unchanged in the arrangement shown in FIG. 1, if there is a volume difference $\Delta V$ between the measuring side and reference side pneumatic systems, the differential pressure $\Delta P$ which is detected after opening of the electromagnetic valves $SV_3$ and $SV_4$ will be proportional to the product of the initial pressure $P_T$ applied to the tanks 13 and 14 and the volume difference $\Delta V$. The proportional constant K in this case is $K = V_T/(V_T + V_M)^2$. By setting $\Delta P/\Delta V = S$, expression (6) can be modified as follows:

$$S = \frac{\Delta P}{\Delta V} = -K \cdot P_T \quad (7)$$

where S represents the differential pressure detection sensitivity of the differential pressure detector 19 for the volume difference in the constitution depicted in FIG. 1.

If the initial pressure $P_T$ which is applied to the tanks 13 and 14 is fixed, expression (7) will always hold within a range in which the volume difference $\Delta V$ is sufficiently small. Accordingly, if $S = \Delta P_1/\Delta V_1$ and $S = \Delta P_2/\Delta V_2$ for different volume differences $\Delta V_1$ and $\Delta V_2$, respectively, then the following expression will hold:

$$S = \frac{\Delta P_1}{\Delta V_1} = \frac{\Delta P_2}{\Delta V_2} = \frac{\Delta P_2 - \Delta P_1}{\Delta V_2 - \Delta V_1} \quad (8)$$

That is to say, by measuring the differential pressures $\Delta P_1$ and $\Delta P_2$ in the cases where two containers to be measured provide the different volume differences $\Delta V_1$ and $\Delta V_2$, respectively, the differential pressure detection sensitivity S can be computed using expression (8). In practice, the differential pressure $\Delta P_1$ is measured for one container to be measured and after venting both pneumatic systems to the atmosphere, a known volume $\Delta V_S$ is added to the measuring side pneumatic system by the volume generator 23, with the container held intact, and then the differential pressure $\Delta P_2$ is measured through processes similar to those for measurement of $\Delta P_1$. The volume $\Delta V_S$ is a volume difference variation ($\Delta V_2 - \Delta V_1$) in expression (8), and accordingly the detection sensitivity S can be calculated from expression (8).

If the measuring side and reference side pneumatic systems are designed so that the content volumes of their pipes are equal to each other, then the volume difference $\Delta V$ will be equal to the volume difference between the container 17 and the reference container 18 in expression (1). Accordingly, by calculating the detection sensitivity S for the predetermined initial pressure $P_T$ as mentioned above, the volume difference $\Delta V$ between another container to be measured 17 of an unknown volume and the reference container 18 can be obtained with the following expression, using the detection sensitivity S.

$$\Delta V = \Delta P/S \quad (9)$$

Letting the volumes of the container to be measured 17 and the reference container 18 be represented by $V_w$ and $V_m$, respectively, the volume $V_w$ of the container 17 can be calculated as follows:

$$V_w = V_m + \Delta V \quad (10)$$

To improve the measurement accuracy, it is necessary to fully satisfy the requirement $\Delta V << (V_T + V_M)$, and to this end, it is preferable that the volume difference $\Delta V$ itself be small. In other words, it is desirable that the volume of the reference container 18 be as close to the volume of the container 17 as possible. In the case of measuring scattering volumes of many containers of the same kind during manufacture, a suitable one of the containers is used as the reference container 18 and the volume differences between the reference container 18 and the other containers can be measured one after another based on expression (9).

In general, designed volumes of various designed containers to be measured are known. Accordingly, in the case of changing the kind of the containers to be measured, the reference container 18 need not always be changed correspondingly, but instead its volume can be adjusted and set, by the volume adjuster 24, to a value substantially equal to a desired reference volume. By this adjustment a volume $\Delta v$ is imparted to the reference container 18; this is equivalent to the installation of a reference container of substantially the same volume as that of the container to be measured 17. After the adjustment by the volume adjuster 24 the differential pressures $\Delta P_1$ and $\Delta_2$ are measured as mentioned previously and the differential pressure detection sensitivity S is calculated from expression (8). In this instance, the calculation of expression (10) is performed on the assumption that the content volume of the reference container 18 is $(V_m + \Delta v)$ in the subsequent volume measurement. That is, the volume of the container 17 is calculated by $$V_w = V_m + \Delta v + \Delta V \quad (11)$$

(C) Correction of Differential Pressure

Figure 3:
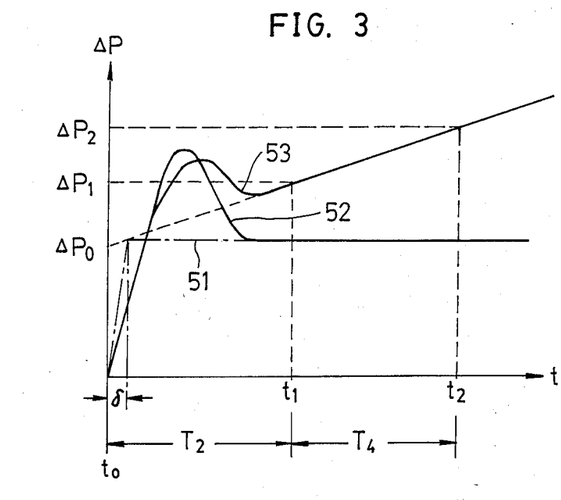
FIG. 3 is a graph showing variations in the output of a differential pressure detector with time.

While in the above it is assumed that the container to be measured 17 is leak-free, a description will be given of the case where the container 17 has a slight leak. In the absence of leakage, the differential pressure between the measuring side and reference side pneumatic systems after opening the electromagnetic valves $SV_3$ and $SV_4$ at a time point $t_0$ will reach a constant value in a short time $\delta$ and remain unchanged thereafter, as indicated by the one-dot chain line 51 in FIG. 3. Now this will be considered in terms of the output of the differential pressure detector 19. In the case where a diaphragm type differential pressure detector, for example, is employed as the detector 19, the detector output rises slowly, overshoots the aforementioned constant value and then goes back thereto as indicated by the solid line 52, because of a slow response by displacement of the diaphragm and the resulting transient phenomenon. Where the container 17 has a slight leak as compared with its content volume, the pressure in the measuring side pneumatic system decreases with time, and consequently the output of the differential pressure detector 19 also varies. Since this variation can be regarded as being linear within a short period of time, the detected differential pressure varies as indicated by the solid line 53 if the response characteristic of the differential pressure detector 19 is taken into account. Immediately after opening the electromagnetic valves $SV_3$ and $SV_4$ (after the time $\delta$, for instance) the actual leakage of air is negligibly small, so that the differential pressure at that time can be used as a correct differential pressure. This differential pressure ought to be substantially equal to a differential pressure value $\Delta P_0$ at a point where an extension of the straight portion of the curve 53 crosses the ordinate (the differential pressure) at the time point $t_0$. Letting $\Delta P_1$ and $\Delta P_2$ stand for differential pressures detected at time points $t_1$ and $t_2$ in the straight line region of the curve 53, the differential pressure value $\Delta P_0$ is given by the following expression:

$$\Delta P_0 = \Delta P_1 - (\Delta P_2 - \Delta P_1)\frac{t_1 - t_0}{t_2 - t_1} \quad (12)$$

By using this differential pressure $\Delta P_0$ in place of $\Delta P$ in expression (9), the volume difference $\Delta V$ between the container 17 and the reference container 18 can be obtained with high accuracy even if the container 17 has a leak.

(D) Correction of Detection Sensitivity

In the case where the volume differences $\Delta V$ between many containers and the reference container 18 are successively measured based on expression (9), using the detection sensitivity S of the same value, it is necessary that the initial pressure $P_T$ which is applied to the tanks 13 and 14 always be constant for each measurement, as will be seen from expression (7), but a change in the pressure of the compressed air source 11 will naturally cause a change in the pressure $P_T$. However, since the volumes $V_T$ of the tanks 13 and 14 and the volume $V_M$ of the reference container 18 remain unchanged, the proportional constant, $K = V_T/(V_T + V_M)^2$, remains constant. Accordingly, letting $S'$ a value of the detection sensitivity of the differential pressure detector 19 when the initial pressure valve applied to the tanks 13 and 14 is $P_T'$, the following expression holds:

$$S' = -K \cdot P_T' \quad (13)$$

From expressions (7) and (13) the following expression is obtained:

$$S' = S \cdot P_T'/P_T \quad (14)$$

Therefore, it is necessary, in the measurement of each container 17, only to detect the pressure $P_T'$ of air filling up the tanks 13 and 14 through the electromagnetic valves $SV_1$ and $SV_2$, by the pressure detector 22, correct the sensitivity by expression (14), and use the corrected sensitivity $S'$ instead of using the sensitivity S in expression (9). As a result of this, once the sensitivity S has been measured there is no need of measuring the sensitivity by driving the volume adder 23 prior to each volume measurement.

(E) Constitution of the Control System

Figure 2:
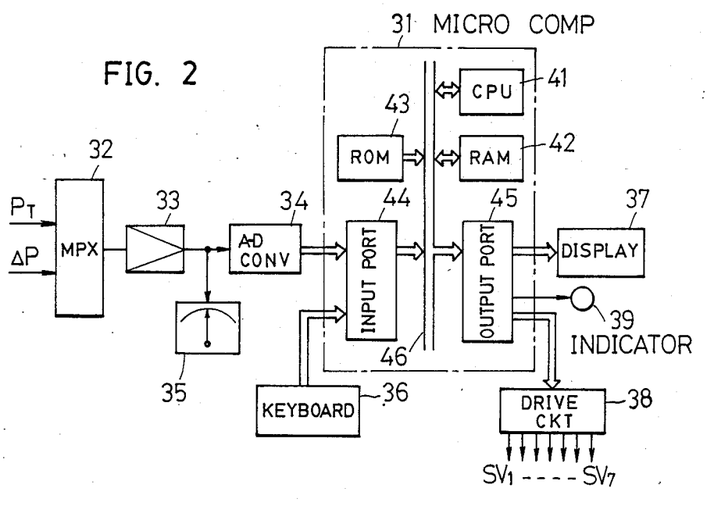
FIG. 2 is a block diagram illustrating a control system of the volume measuring apparatus of the present invention.

FIG. 2 illustrates the control system which controls the operation of the volume measuring mechanical system shown in FIG. 1 and calculates the detection sensitivity S, the volume difference $\Delta V$, etc. based on various constants and measured values. The control system is composed of a microcomputer 31 and other peripheral devices. The microcomputer 31 includes a CPU 41, a RAM 42, a ROM 43, an input port 44 and an output port 45, which are interconnected via a common bus 46.

The outputs of the differential pressure detector 19 and the pressure detector 22 are both connected to the input of a multiplexer 32, wherein one of the differential pressure signal $\Delta P$ and the pressure signal $P_T$ is selected for output therefrom. The output of the multiplexer 32 is connected to an amplifier 33, wherein the differential pressure signal $\Delta P$ or the pressure signal $P_T$ is amplified. The output of the amplifier 33 is connected to the input of an A-D converter 34, wherein the amplified output is converted to a digital signal, and at the same time, the output of the amplifier 33 is connected to a monitoring meter 35 as well for providing an analog display of the amplified output. The output of the A-D converter 34 is loaded into the microcomputer 31 via the input port 44. Connected to the input port 44 is a keyboard 36 through which are entered set times $T_1$, $T_2$ and $T_3$ for various timers and the additional volume $\Delta V_S$ to set in the volume adder 23. Connected to the output port 45 are a display device 37 for displaying calculated results and a drive circuit 38 by which each electromagnetic valve in FIG. 1 is driven to open and close. The ROM 43 has stored therein, as programs, the operation procedures for the detection sensitivity measurement and the volume difference measurement by the apparatus of the present invention, shown in FIGS. 4 and 5. The CPU 41 follows the programs to perform control of the electromagnetic valves $SV_1$ to $SV_7$ by the drive circuit 38, the signal selection in the multiplexer 32, the display of calculated results on the display device 37 and the indication of a display to an indicator 39, and execute required calculations for the detection sensitivity and the measured volume.

(F) Sensitivity Measuring Operation

Prior to the volume measurement by the apparatus of the present invention the detection sensitivity S is measured. To this end, a leak-free container is connected, as the container to be measured 17, to the measuring side pipe 15. Next, a predetermined additional volume $\Delta V_S$ which is provided by the volume adder 23, that is, the movable distance of the piston, is set. Furthermore, the pressure of air which is applied to the tanks 13 and 14 is set by adjusting the pressure reduction valve 12 while monitoring an indication on the pressure gage 21. After this, the operator enters a start instruction through the keyboard 36. Thereafter the mechanical system shown in FIG. 1 is controlled and various computations are performed based on measured data in the control system shown in FIG. 2, following the flowchart depicted in FIG. 4.

Figure 4:
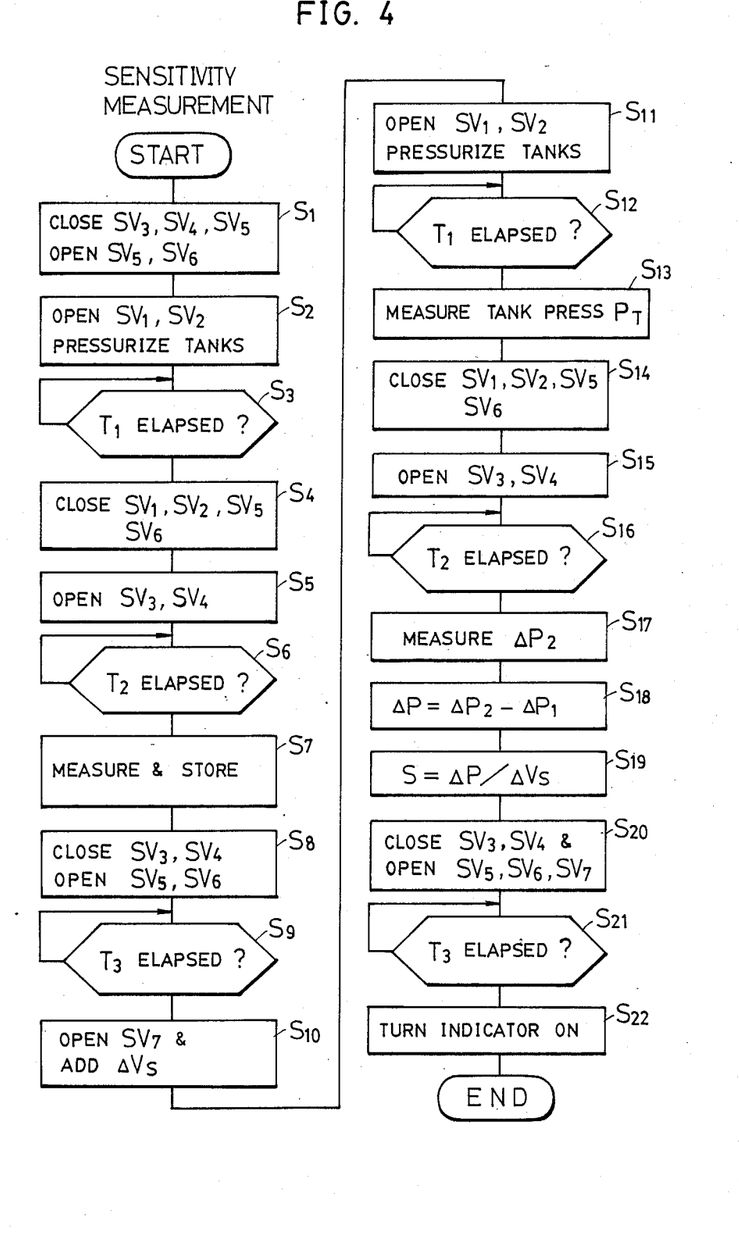
FIG. 4 is a flowchart showing a sensitivity measuring operation.

In step $S_1$ the electromagnetic valves $SV_3$, $SV_4$ nd $SV_7$ are closed and the valves $SV_5$ and $SV_6$ are opened, venting the measuring side and reference side pneumatic systems to the atmosphere. In step $S_2$ the electromagnetic valves $SV_1$ and $SV_2$ are opened, filling the tanks 13 and 14 with air of the preset pressure. In step $S_3$ a $T_1$ timer set at a predetermined address in the RAM 42 is started, and it is determined whether the time $T_1$ has elapsed or not. If yes, it is decided that the pressures in the tanks 13 and 14 have reached equilibrium, and the program proceeds to step $S_4$, where the electromagnetic valves $SV_1$, $SV_2$, $SV_5$ and $SV_6$ are closed, followed by step $S_5$ where the electromagnetic valves $SV_3$ and $SV_4$ are opened. In step $S_6$ a $T_2$ timer set at a predetermined address in the RAM 42 is started, and it is determined whether or not the time $T_2$ has passed. If yes, it is decided that the pressures in the measuring side and reference side pneumatic systems have reached equilibrium states, and the program proceeds to step $S_7$, where the differential pressure $\Delta P$ is selected by the multiplexer 32 and the detected differential pressure $\Delta P_1$ at that time is received from the differential pressure detector 19 and stored at a predetermined address in the RAM 42. In step $S_8$ the electromagnetic valves $SV_3$ and $SV_4$ are closed and the electromagnetic valves $SV_5$ and $SV_6$ are vented, opening the measuring side and reference side pneumatic systems to the atmospheric pressure. In step $S_9$ a $T_3$ timer set at a predetermined address of the RAM 42 is started, and it is determined whether or not the time $T_3$ has passed. If yes, the program proceeds to step $S_{10}$, where the electromagnetic valve $SV_7$ is open, by which the piston of the volume generator 23 is driven by a preset movable distance, adding a predetermined volume $\Delta V_S$ to the measuring side pneumatic system. In step $S_{11}$ the electromagnetic valves $SV_1$ and $SV_2$ are opened again, increasing the pressure in each of the tanks 13 and 14 to a preset value. In step $S_{12}$ the $T_1$ timer is started and it is determined whether or not the time $T_1$ has passed. If yes, the program proceeds to step $S_{13}$, where the tank pressure $P_T$ is selected by the multiplexer 32 and the detected tank pressure $P_T$ at that time is received and stored at a predetermined address in the RAM 42. In step $S_{14}$ the electromagnetic valves $SV_1$, $SV_2$, $SV_5$ and $SV_6$ are closed, and in step $S_{15}$ the electromagnetic valves $SV_3$ and $SV_4$ are opened. In step $S_{16}$ the $T_2$ timer is started again, and it is determined whether or not the time $T_2$ has passed. If yes, the program proceeds to step $S_{17}$, where the differential pressure $\Delta P$ is selected by the multiplexer 32, and the detected differential pressure $\Delta P_2$ by the differential pressure detector 19 is stored at a predetermined address in the RAM 42. In step $S_{18}$ the variation $\Delta P$ from the differential pressure $\Delta P_1$ to $\Delta P_2$ is calculated. In step $S_{19}$ the detection sensitivity S is calculated which represents the differential pressure variation $\Delta P$ caused by the added volume $\Delta V_S$. In step $S_{20}$ the electromagnetic valves $SV_3$ and $SV_4$ are closed and the electromagnetic valves $SV_5$ and $SV_6$ are opened, venting both pneumatic systems to the atmosphere, and the electromagnetic valve $SV_7$ is opened. In step $S_{21}$ the $T_3$ timer is started again and after the time $T_3$ has passed, the program proceeds to step $S_{22}$, where the indicator 39 is lighted, finishing the sensitivity measurement. The sensitivity S calculated in step $S_{19}$ is stored at a predetermined address in the RAM 42.

(G) Container Measuring Operation

Next, a description will be given, with reference to the flowchart shown in FIG. 5, of the operation for measuring the volume difference $\Delta V$ between the container to be measured 17 and the reference container 18 and/or the content volume $V_w$ of the container 17.

When the container enters a start instruction through the keyboard 36 after mounting the container 17 to the measuring side pipe 15, the electromagnetic valves $SV_3$ and $SV_4$ are closed and the electromagnetic valves $SV_5$ and $SV_6$ are opened in step $S_1$. In step $S_2$ the electromagnetic valves $SV_1$ and $SV_2$ are opened, filling the tanks 13 and 14 with air of a preset pressure. In step $S_3$ the $T_1$ timer set at a predetermined address in the RAM 42 is started and it is determined whether or not the time $T_1$ has passed. If yes, the pressure $P_T'$ in the tank is measured in step $S_4$. In step $S_5$ the tank pressure $P_T$ and the detection sensitivity S stored in the RAM 42 in the sensitivity measuring process are read out and the corrected sensitivity $S'$ is calculated using expression (14).

In step $S_6$ the electromagnetic valves $SV_1$, $SV_2$, $SV_5$ and $SV_6$ are closed, and in step $S_7$ the electromagnetic valves $SV_3$ and $SV_4$ are opened. In the next step $S_8$ the $T_2$ timer set at a predetermined address in the RAM 42 is started and it is determined whether or not the time $T_2$ has passed. If yes, the program proceeds to step $S_9$, where the differential pressure $\Delta P_1$ between the measuring side and reference side pneumatic systems is loaded into the RAM 42. In step $S_{10}$ a $T_4$ timer set at a predetermined address in the RAM 42 is started and it is determined whether or not the time $T_4$ has passed. If yes, the program proceeds to step $S_{11}$, where the differential pressure $\Delta P_2$ between the two pneumatic systems is measured again and loaded into the RAM 42. In step $S_{12}$ the measured differential pressures $\Delta P_1$ and $\Delta P_2$ and the times $T_2$ and $T_4$, i.e. $(t_1-t_0)$ and $(t_2-t_1)$ in FIG. 3, are read out of the RAM 42 and the corrected differential pressure $\Delta P_0$ is computed using expression (12). In step $S_{13}$ the corrected sensitivity $S'$ is read out of the RAM 42 and the corrected volume difference $\Delta V$ between the reference container 18 and the container to be measured 17 is calculated using expression (9). In the next step $S_{14}$ the volume difference $\Delta V$ is displayed on the display device 37. In step $S_{15}$ the electromagnetic valves $SV_3$ and $SV_4$ are closed and the electromagnetic valves $SV_5$ and $SV_6$ are opened. In step $S_{16}$ the $T_3$ timer is started, and after the elapsed time $T_3$ the program proceeds to step $S_{17}$, where the indicator 39 is lighted, completing the measurement. If necessary, a step 13' of calculating the volume $V_w$ of the container 17 by expression (10) may also be provided between steps $S_{13}$ and $S_{14}$, as indicated by the broken line.

(H) Other Embodiments

Figure 6:
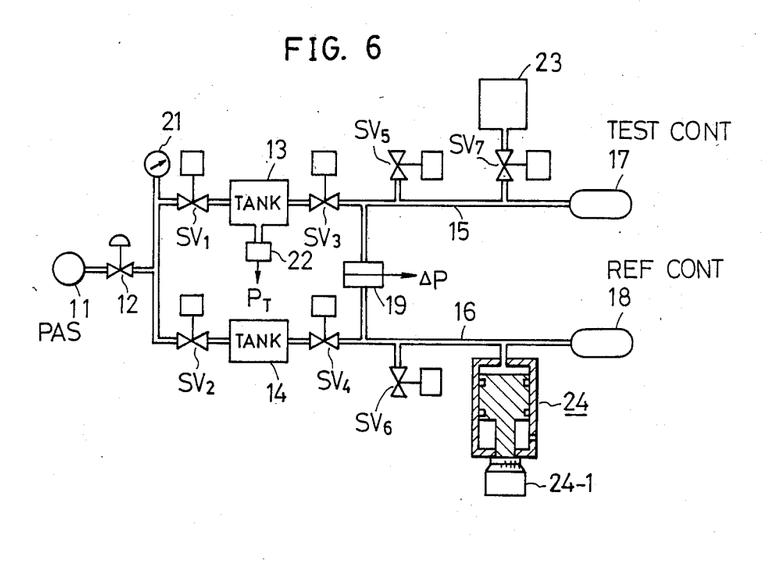
FIG. 6 is a diagram illustrating the mechanical system of another embodiment of the present invention.

FIG. 6 illustrates the mechanical system of another embodiment of the volume measuring apparatus of the present invention, which is substantially identical in structure with the embodiment of FIG. 1 except that the volume adder 23 is connected to the measuring side pipe 15 through the two-way electromagnetic valve $SV_7$. Also in the principle of measurement this embodiment is identical with the above-described embodiment if the definition of the volume $V_W$ in expression (1) is construed as the total volume of the measuring side pneumatic system when no volume is added by the volume adder 23, i.e. when the electromagnetic valve $SV_7$ is closed. This embodiment differs from the embodiment of FIG. 1 in that some of the steps in the detection sensitivity measurement can be omitted. The control system for controlling the mechanical system shown in FIG. 6 is also identical with the control system depicted in FIG. 2, except slight modifications of its operation program for sensitivity measurement.

Figure 7:
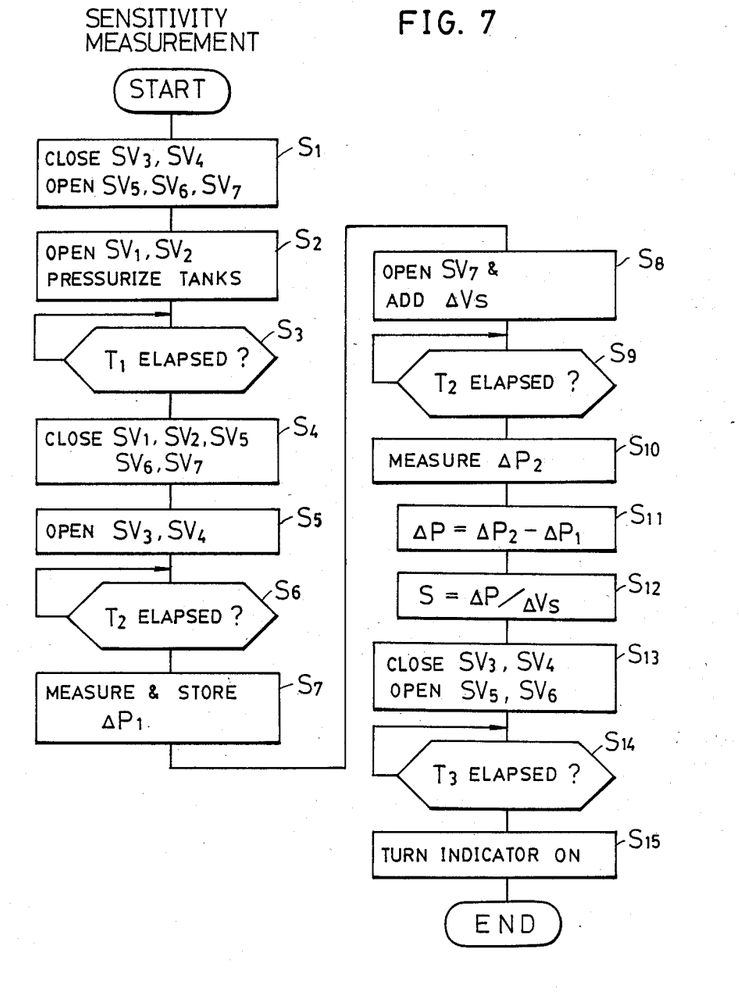
FIG. 7 is a flowchart showing the sensitivity measuring operation in the embodiment depicted in FIG. 6.

The detection sensitivity measurement by the volume measuring apparatus shown in FIG. 6 is conducted following the operation flowchart depicted in FIG. 7. Prior to the measurement a leak-free container is connected, as the container to be measured 17, to the measuring side pipe 15 as is the case with the embodiment shown in FIG. 1. Next, the pressure of air which is applied to the tanks 13 and 14 is set by regulating the pressure reduction valve 12 while monitoring the indication on the pressure gage 21. After this the operator enters a start instruction through the keyboard 36. Thereafter the mechanical system depicted in FIG. 6 is controlled following the operation flowchart shown in FIG. 7 and various computations are conducted in the control system shown in FIG. 2.

In step $S_1$ the electromagnetic valves $SV_3$ and $SV_4$ are closed and the electromagnetic valves $SV_5$, $SV_6$ and $SV_7$ are opened, venting the two pneumatic systems to the atmosphere. In step $S_2$ the electromagnetic valves $SV_1$ and $SV_2$ are opened, filling the tanks 13 and 14 with air of the preset pressure. In step $S_3$ the $T_1$ timer set at a predetermined address in the RAM 42 is started and it is determined whether or not the time $T_1$ has passed. If yes, it is decided that the pressures in tanks 13 and 14 have reached equilibrium, and the program proceeds to step $S_4$, where the electromagnetic valves $SV_1$, $SV_2$, $SV_5$, $SV_6$ and $SV_7$ are closed, and in the next step $S_5$ the electromagnetic valves $SV_3$ and $SV_4$ are opened. In step $S_6$ the $T_2$ timer set at a predetermined address in the RAM 42 is started and it is determined whether or not the time $T_2$ has passed. If yes, it is decided that the pressures in the measuring side and reference side pneumatic systems have reached equilibrium, and the program proceeds to step $S_7$, where the differential pressure $\Delta P$ is selected by the multiplexer 32 and the detected differential pressure $\Delta P_1$ at that time is received from the differential pressure detector 19 and stored at a predetermined address in the RAM 42. In step $S_8$ the electromagnetic valve $SV_7$ is opened, adding the predetermined volume $\Delta V_S$ to the measuring side pneumatic system. In step $S_9$ the $T_2$ timer is started again and it is determined whether or not the time $T_2$ has passed. If yes, the program proceeds to step $S_{10}$, where the differential pressure $\Delta P$ is selected by the multiplexer 32 and the detected differential pressure $\Delta P_2$ from the differential pressure detector 19 is stored at a predetermined address in the RAM 42. In step $S_{11}$ the variation $\Delta P$ from the differential pressure $\Delta P_1$ to $\Delta P_2$ is calculated and the detection sensitivity S is computed which represents the differential pressure variation $\Delta P$ for the volume $\Delta V_s$ added in step $S_{12}$. In the next step $S_{13}$ the electromagnetic valves $SV_3$ and $SV_4$ are closed and the electromagnetic valves $SV_5$ and $SV_6$ are opened, venting the pneumatic systems to the atmosphere. In the succeeding step $S_{14}$ the $T_3$ timer is started again and after the elapse of time $T_3$ the indicator 39 is lighted in step $S_{15}$, completing the sensitivity measurement. The sensitivity S computed in step $S_{12}$ is held at a predetermined address in the RAM 42.

As will be appreciated from the above, the embodiment depicted in FIG. 6 is adapted to measure the differential pressures $\Delta P_1$ and $\Delta P_2$ before and after the conduction of the electromagnetic valves $SV_7$ through which the volume adder filled with air of the atmospheric pressure and the measuring side pneumatic system are connected. As a result of this, the steps from $S_8$ to $S_{16}$ in FIG. 5, in which after the measuring side and reference side pneumatic systems are once vented to the atmospheric pressure the tanks 13 and 14 are again pressurized and then the differential pressure $\Delta P_2$ is measured, are replaced by steps $S_8$ and $S_9$ alone shown in FIG. 7. That is, the number of steps involved is markedly reduced. The sensitivity S stored in the RAM 42 in the process shown in FIG. 7 is used in the subsequent volume measurement, but the operation flowchart therefor is exactly the same as depicted in FIG. 5, and hence will not be described again, for the sake of brevity.

As described above, when the kind and consequently the volume of the container to be measured 17 is changed, the reference container 18 need not be exchanged correspondingly but instead the volume adjuster 24 needs only to be adjusted in accordance with the new volume of the container to be measured 17. This is equivalent to the attachment of a reference container 18 of substantially the same volume as the new kind of container 17. Accordingly, there is no need to provide reference containers of the same number as the kinds of containers to be measured; namely, the provision of the volume adjuster 24 permits the reduction of the number of reference containers to be provided. In this instance, it is necessary that the volume change $\Delta V_C$ of the volume adjuster 24 adjusted prior to the sensitivity measurement in FIG. 4 or 7 be held intact during the volume measurement in FIG. 5. Accordingly, letting an equivalent reference volume be represented by $V_m'=(V_m+\Delta V_C)$, the volume difference measured in step $S_{13}$ in FIG. 5 represents the volume difference relative to the equivalent reference volume $V_m'$, and expression (10) is transformed as follows:

$$V_w-(V_m+\Delta V_C)=\Delta V \quad (15)$$

Figure 5:
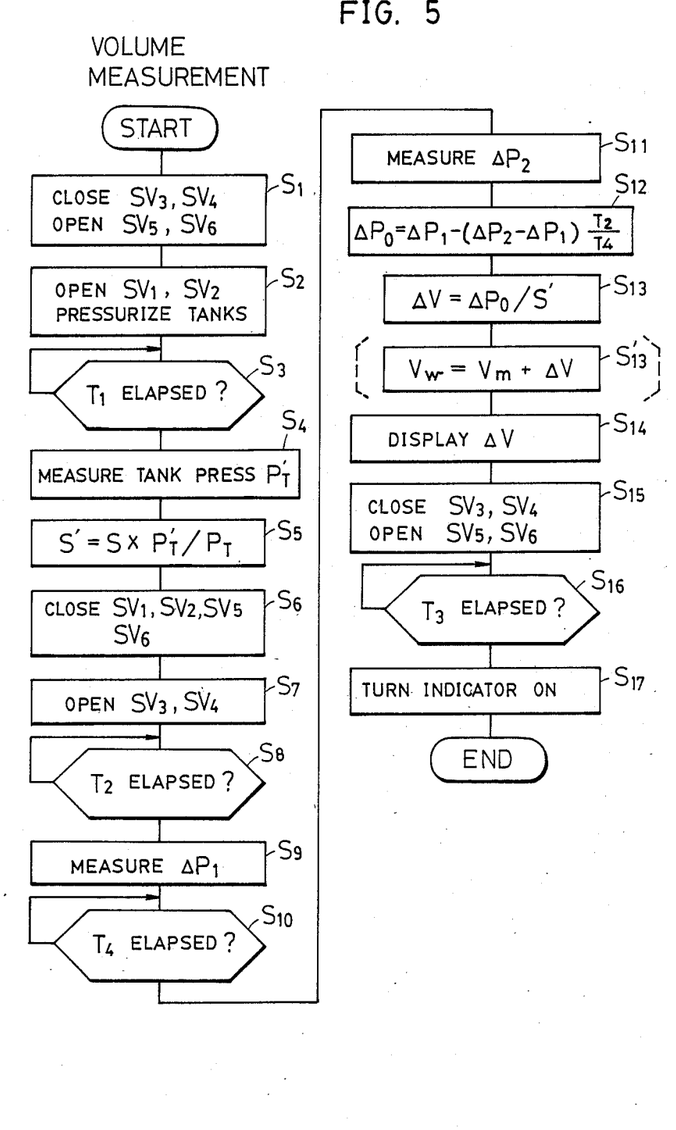
FIG. 5 is a flowchart showing a volume measuring operation.

Therefore, in the case os obtaining the volume of the container to be measured 17, the calculation in step $S_{13}'$ in FIG. 5 must be performed using $(V_m+\Delta V_C)$ instead of using $V_m$. Of course, in the case where the volume adjuster 24 is attached to the measuring side pneumatic system, $V_w$ needs only to be replaced with $(V_w+\Delta V_C)$ in expression (10).

In the case of measuring a large number of containers, the detection sensitivity S shown in the flowchart of FIG. 4 or 7 is obtained first and then the measurement shown in FIG. 5 is conducted for each container to be measured. When the initial tank pressure $P_T$ is correctly set for each container to be measured, steps $S_4$ and $S_5$ in FIG. 5 are left out and the uncorrected sensitivity S is used in step $S_{13}$.

What is defined by expression (1) is always the volume difference between the measuring side and reference side pneumatic systems, so that the volume adder 23 may be provided in the reference side pneumatic system instead of the measuring side. Similarly, the volume adjuster 24 may also be provided in the measuring side pneumatic system. Moreover, the volume adder 23 and the volume adjuster 24 may also be attached to the same pneumatic system. It is preferable that the volume adjuster 24 be adjustable in both directions in which the volume increases and decreases from the neutral point.

The proportional constant, $K=V_T/(V_T+V_M)^2$, in expression (6) becomes maximum by selecting $V_T$ equal to $V_M$ for a given value of $V_M$. In other words, if the containes to be measured have substantially the same volume, the optimum sensitivity can be obtained by designing the apparatus so that the volumes $V_T$ of the tanks 13 and 14 are selected approximately equal to the volume $V_M$.

As described above, the present invention permits successive measurement of the volumes of containers through use of gas, not water, and hence is particularly suitable for volume measurement in their production process. Moreover, by premeasuring the sensitivity of detection of a differential pressure change with a volume change through use of the volume adder, a correct volume difference or volume can be measured even if the container to be measured has a leak.

It will be apparent that many modifications and variations may be effected without departing from the scope of the novel concepts of the present invention.

What is claimed is:

1. A volume difference measuring apparatus for measuring the volume difference of a container under measurement with respect to a reference container, comprising:
   a pair of tank means of substantially the same volume for supplying air to said container under measurement and to said reference container;
   means for filling said pair of tank means with air of an equal pressure;
   means for providing a known volume variation to one of said containers;
   means for measuring the differential pressure between said container under measurement and said reference container;
   means for computing, from said known volume variation and the difference between a first differential pressure measured by said measuring means without adding said volume variation and a second differential pressure measured by said measuring means after adding said volume variation, a ratio of the difference between said first and second differential pressures to said volume variation, said ratio representing the detection sensitivity of said differential pressure measuring means; and
   means for computing the volume difference of said container under measurement with respect to said reference container by multiplying the differential pressure measured by said measuring means and said detection sensitivity.

2. The apparatus of claim 1 wherein said volume variation providing means includes a cylinder and a piston the position of which can be varied in the cylinder to effect said volume variation.

3. The apparatus of claim 1, wherein the volume variation providing means includes a valve and a volume adder connected to the valve and having a volume equal to the volume variation.

4. The apparatus of claim 2 or 3, further including means for measuring the initial pressures of the pair of tank means, and means for correcting the detection sensitivity based on the initial pressures applied to the pair of tank means during measurement of the detection sensitivity and the initial pressure applied to the pair of tank means during the measurement of the difference of the container under measurement.

5. The apparatus of claim 2 or 3, further including means for correcting the measured differential pressure based on two differential pressure data measured by the differential pressure measuring means at two predetermined time points.

6. The apparatus of claim 2 or 3 further including volume adjusting means provided in either one of a measurement side pneumatic system which includes said container under measurement and a reference side pneumatic system which includes said reference container, for establishing a balance between the respective volumes of said systems.

7. The apparatus of claim 1, wherein the filling means includes a pressurized gas source and first and second valves connected thereto; the pair of tank means include first and second tanks connected to the first and second valves, respectively, and third and fourth valves connected to the first and second tanks, respectively; and the container under measurement and the reference container are connected to the third and fourth valves, respectively.

8. The apparatus of claim 7, wherein the container under measurement is connected to the third valve through a measuring side pipe; the reference container is connected to the fourth valve through a reference side pipe; and the differential pressure measuring means is connected between said measuring side pipe and said reference side pipe.

9. The apparatus of claim 8 wherein the volume variation providing means includes a cylinder connected to one of said measuring side and reference side pipes, and a piston provided in the cylinder and settable in said cylinder to a position which effects said volume variation.

10. The apparatus of claim 8, wherein the volume variation providing means includes a fifth valve connected to one of said measuring side and reference side pipes, and a volume adder connected to the fifth valve and having a volume equal to the volume variation to be provided.

11. The apparatus of claim 9 or 10, further including volume adjusting means connected to one of said measuring side and reference side pipes, for establishing a balance of volume therebetween.

12. A volume difference measuring method for measuring the volume difference between a container under measurement and a reference container, comprising the steps of:
  causing said container under measurement and said reference container to communicate with a pair of tanks which have substantially the same volume and which are filled with gas under the same pressure, respectively;
  measuring first and second differential pressures between said container under measurement and said reference container under conditions where a known volume variation has and has not been provided, respectively, to one of said containers;
  computing the ratio of the difference between said first and second differential pressures to said volume variation, said ratio representing a detection sensitivity;
  again causing the container under measurement and said reference container to communicate with said pair of tanks, respectively;
  then measuring the differential pressure between said container under measurement and said reference container; and
  computing the volume difference between said container under measurement and said reference container by multiplying said last-mentioned differential pressure and said detection sensitivity.

13. A volume difference measuring method for measuring the volume difference between a container under measurement and a reference container, comprising the steps of:
  causing said container under measurement and said reference container to communicate with a pair of tanks which have substantially the same volume and which are filled with gas under the same pressure, respectively;
  measuring a first differential pressure between said container under measurement and said reference container after establishing communication with said pair of tanks;
  providing a known volume variation to one of said containers;
  measuring a second differential pressure between said container under measurement and said reference container after providing said known volume variation;
  computing the ratio of the difference between said first and second differential pressures tos aid volume variation, said ratio representing a detection sensitivity;
  causing the container under measurement and said reference container to communicate with said pair of tanks, respectively;
  thereafter measuring the differential pressure between said container under measurement and said reference container; and
  computing the volume difference between said container under measurement and said reference container by multiplying said last-mentioned differential pressure and said detection sensitivity.

* * * * *